United States Patent [19]

Kosugui

[11] 4,245,671
[45] Jan. 20, 1981

[54] SOLENOID PILOT OPERATED VALVE

[75] Inventor: Seiji Kosugui, Soka, Japan

[73] Assignee: Shoketsu Kinzoku Kogyo Kabushiki Kaisha, Tokyo, Japan

[21] Appl. No.: 822,244

[22] Filed: Aug. 5, 1977

[30] Foreign Application Priority Data

Aug. 26, 1976 [JP] Japan ............................. 51-114189

[51] Int. Cl.³ .......................................... F15B 13/043
[52] U.S. Cl. .............................. 137/625.64; 137/625.6
[58] Field of Search ....................... 137/625.6, 625.64

[56] References Cited

U.S. PATENT DOCUMENTS 3,824,898 7/1974 Pauliukonis ........................ 91/459 X
3,913,620 10/1975 Pauliukonis ..................... 137/625.64

Primary Examiner—Gerald A. Michalsky
Attorney, Agent, or Firm—Haight & Huard

[57] ABSTRACT

There is described an improvement in solenoid pilot operated valve using a spool/piston assembly which is operated by fluid pressure in a pilot chamber, wherein a piston is slidably mounted on one or both ends of a spool and independently returnable to its initial position upon relieving the pilot chamber of fluid pressure.

10 Claims, 7 Drawing Figures

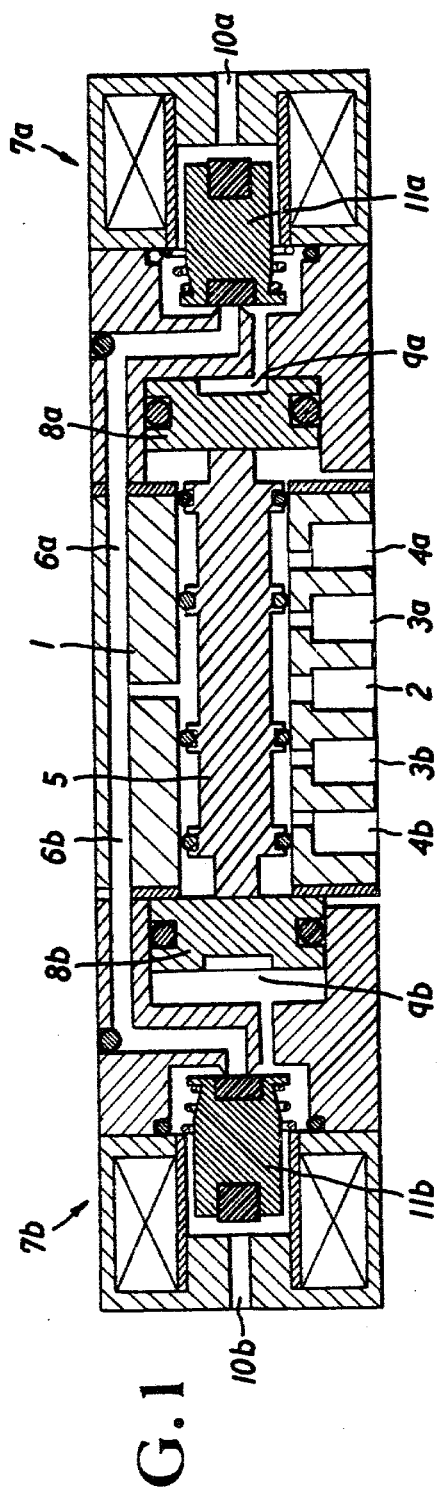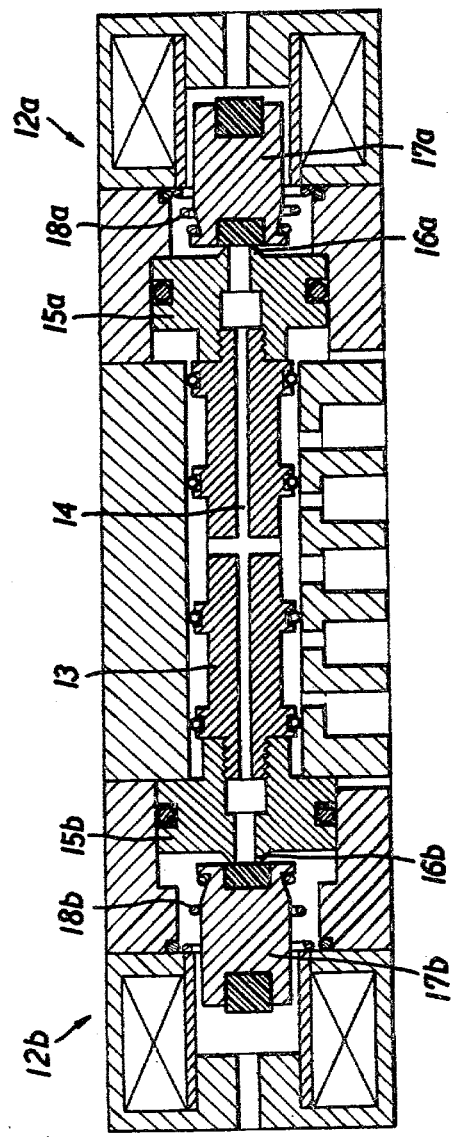
FIG.1
FIG.2

SOLENOID PILOT OPERATED VALVE

BACKGROUND OF THE INVENTION

This invention relates to improvement in solenoid pilot operated valve using a spool/piston assembly which is operated by fluid pressure in a pilot chamber to switch an input pressurized fluid from one to the other output port.

FIG. 1 of the accompanying drawings shows a known solenoid pilot operated valve, wherein the communication between an input port 2, output ports 3a and 3b and drain ports 4a and 4b is controlled by a spool valve 5 which is slidably received in the valve casings in the usual manner. The spool valve 5 with pistons 8a and 8b is driven by the fluid pressure which is led to pilot valves 7a and 7b through axial passages 6a and 6b in the casings 1, respectively. The pilot valves 7a and 7b include plungers 11a and 11b, respectively, which are axially movable for connecting the pilot chambers 9a and 9b, which are provided on the outer sides of pistons 8a and 8b, either with axial passages 6a and 6b or with drain ports 10a and 10b, respectively.

One of the drawbacks of the change-over valve construction shown in FIG. 1 is that the axial passages leading to the respective pilot chambers through the spool and piston casings are complicated and require additional efforts for sealing those passages fluid-tight, preventing the use of a compact valve construction.

FIG. 2 shows another known solenoid pilot operated valve construction, in which the problem of complication is solved to a certain degree by providing axial fluid passages 14 in the body of the spool valve 13. The fluid pressure is thus supplied through the spool 13 to pilot valves 12a and 12b with plungers 17a and 17b which respectively cooperate with pilot valve seats 16a and 16b on the outer end faces of pistons 15a and 15b which are fixedly threaded on the opposite ends of the spool 13.

The valve construction of FIG. 2 also has an inherent drawback in that the pistons 15a and 15b which are fixedly mounted on the opposite ends of the spool 13 are moved together with the spool 13 through a stroke length several times greater than the length which is necessary for the operation of the plungers (cf. the stroke length of plungers 11a and 11b in the valve construction of FIG. 1) As a result, when the piston is in the remotest position from the plunger, it is necessary to move the plunger 17a or 17b through a greater distance in order to close the pilot valve seat 16a or 16b. The increase in the stroke length of the plungers 17a and 17b also makes difficult the designing of the springs 18a and 18b which urge the plungers toward the pilot valve seats 16a and 16b, respectively, and requires pilot valves 12a and 12b of greater power. The valve as a whole presents a construction which is still remote from being "simple and compact".

It is an object of the present invention to provide a solenoid pilot operated valve which will eliminate the above-mentioned drawbacks, more specifically, a solenoid pilot operated valve of simple and compact construction in which the piston at the end of the spool is movable independently of the spool to return to its initial position upon draining the pilot chamber, thereby facilitating the pilot valve seat closing operation by the plunger.

It is another object of the present invention to provide a pilot operated change-over valve which is simple in construction and easy to fabricate.

SUMMARY OF THE INVENTION

According to the present invention, there is provided a solenoid pilot operated valve comprising: a spool casing internally defining a spool chamber and having an input port and a number of output and drain ports in communication with the spool chamber; a spool valve slidably received in the spool chamber and having a number of seal ridges to connect the output ports selectively with either the input port or one of the drain ports; a fluid passage formed axially through the spool valve in communication with the input port; a piston slidably mounted on one end of the spool within a piston chamber formed contiguously to one end of the spool chamber, the piston having an axial bore communicating at the inner end with the axial fluid passage in the spool and terminating at the outer end in a pilot valve seat opening into a pilot chamber provided contiguously to the outer end of the piston chamber; a plunger accommodated within the pilot chamber and movable toward and away from the pilot valve seat and a drain valve seat provided at the outer end of the pilot chamber; plunger biasing means for constantly urging the plunger against the pilot valve seat on the piston; operating means for driving the plunger to unseat from the pilot valve seat and seat on the drain valve seat of the pilot chamber thereby bringing the pilot chamber into fluid communication with the input port through the axial fluid passage and allowing the fluid pressure to act on the piston to shift the spool from a first to a second change-over position; and spool shifting means provided at the other end of said spool chamber and acting to return the spool from the second to the first change-over position.

The effective diameter of the drain valve seat is formed noticeably larger than that of the pilot valve seat to ensure accelerated return movement of the piston upon draining the pilot chamber.

In another aspect of the invention, the spool shifting means is constituted by a second piston slidably mounted at the other end of the spool within a second piston chamber provided contiguously to the other end of the spool chamber and having an axial bore communicating at the inner end thereof with the axial fluid passage of the spool and terminating at the outer end in a second pilot valve seat opening into a second pilot chamber provided contiguously to the outer end of the second piston chamber; a second plunger accommodated within the second pilot chamber and movable toward and away from the second pilot valve seat and a second drain valve seat provided at the outer end of the second pilot chamber; second plunger biasing means for constantly urging the plunger to seat on the second pilot valve seat on the second piston; and second operating means for driving the second plunger to unseat from the second pilot valve seat and seat on the second drain valve seat, thereby bringing the second pilot chamber into fluid communication with the input port through the axial fluid passage and allowing the fluid pressure to act on the piston to shift the spool to the first change-over position. In this instance, the second piston and pilot valve are arranged symmetrically with respect to the first piston and pilot valve to provide a change-over valve of double-piston and -pilot construction.

The above and other objects, features and advantages of the invention will become apparent from the following particular description of preferred embodiment, taken in conjunction with the accompanying drawings.

BRIEF DESCRIPTION OF THE DRAWINGS

In the accompanying drawings:

FIG. 1 is a longitudinal cross-section of a conventional solenoid pilot operated valve;

FIG. 2 is a view similar to FIG. 1 but showing another conventional solenoid pilot operated valve;

Figure 3:
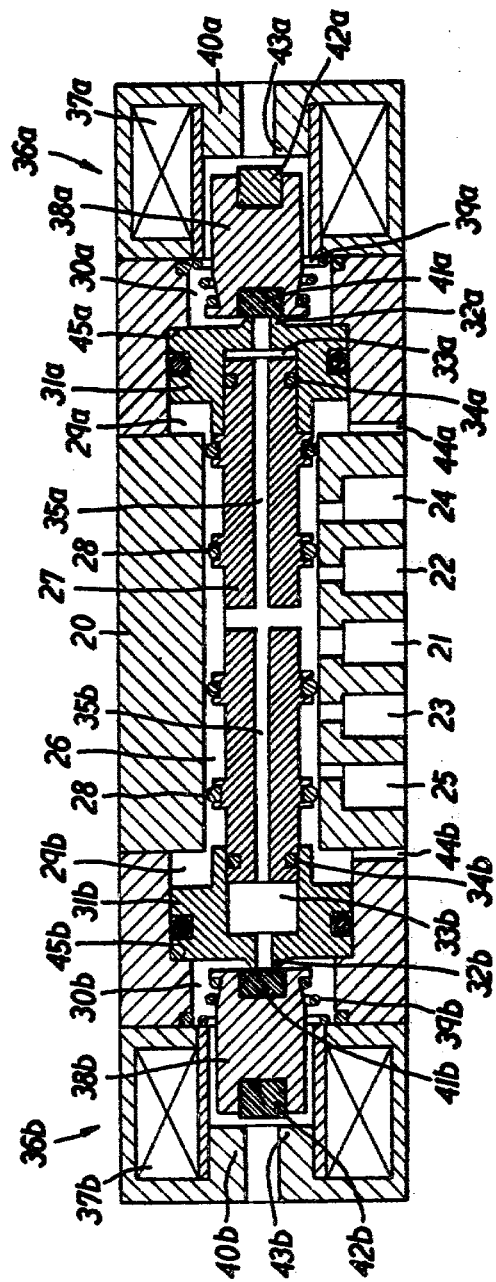
FIG. 3 is a diagrammatic longitudinal cross-section of a solenoid pilot operated valve according to the present invention.

DESCRIPTION OF PREFERRED EMBODIMENTS:

Referring to FIG. 3, the solenoid pilot operated valve according to the invention includes a spool casing 20 internally defining a cylindrical spool chamber 26 and having along its length an input port 21, first output port 22, second output port 23, first drain port 24 and second drain port 25 all in communication with the spool chamber 26. A spool valve 27 with a predetermined number of sealing ridges 28 on its circumference is slidably received in the spool chamber 26 for movement in the axial direction in the usual manner.

Contiguously to the opposite ends of the spool chamber 26, there are provided piston chambers 29a and 29b of a larger diameter in which pistons 31a and 31b are slidably received. The pistons 31a and 31b are respectively provided with axial bores 33a and 33b for slidably receiving the opposite end portions of the spool valve 27 with seal rings 34a and 34b. The spool valve 27 is internally provided with axial passages 35a and 35b which respectively communicate with the pilot valve seats 32a and 32b on the outer end faces of the pistons 31a and 31b through narrow axial passages formed thereacross.

The pilot valves 36a and 36b which are provided on the outer sides of the pistons 31a and 31b respectively have plungers 38a and 38b in pilot chambers 30a and 30b which are formed contiguous to the outer ends of the piston chambers 29a and 29b. Solenoid devices including electromagnetic coils 37a and 37b and cores 40a and 40b are mounted around pilot chambers 30a and 30b which accommodate plungers 38a and 38b. Upon energization of the coil 37a or 37b, the plunger 38a or 38b is attracted by the core 40a or 40b to seat a seal member 42a or 42b on the outer end faces of the plungers sealingly on the drain valve seat 43a or 43b. Coil springs 39a and 39b are mounted between flanged inner ends of the plungers 38a and 38b and the outer end walls of the pilot chambers 30a and 30b to constantly urge the seal members 41a and 41b at the inner ends of the plungers toward the pilot valve seats 32a and 32b on the outer end faces of the pistons, respectively.

It is to be noted that the diameter $d_2$ of the drain valve seats 43a and 43b is sufficiently larger than the diameter $d_1$ of the pilot valve seats 32a and 32b, so that the pistons 31a and 31b are caused to return to the initial position in an accelerated manner as soon as the solenoid devices are de-energized to relieve the respective pilot chambers.

In FIG. 3, the reference numerals 44a and 44b denote aspiratory holes which are provided for the purpose of facilitating the movements of the spool valve 27 and pistons 31a and 31b. Indicated at 45a and 45b are stepped walls formed between the piston and pilot chambers to serve as stoppers for the pistons 31a and 31b, respectively.

In operation of the valve of FIG. 3, when the electromagnetic coils 37a and 37b are in de-energized state, the spool valve 27 assumes a first change-over position, communicating the input port 21 with the first output port 22 while connecting the second output port 23 with the second drain port 25. In this position, the pressurized fluid at the input port 21 is led to both the first output port 22 and the axial bores 33a and 33b of the pistons 31a and 31b through the axial passages 35a and 35b in the spool 27. Since the pilot valve seats 32a and 32b are blocked by the plungers 38a and 38b, respectively, the fluid pressure in the axial passages 35a and 35b acts to press the pistons 31a and 31b against the stoppers 45a and 45b. Simultaneously, the fluid pressure admitted through the axial passages 35a and 35b acts on the outer end faces of the spool 27 which, however, would not change its position as the forces acting on the opposite end faces are equivalent.

Figure 4:
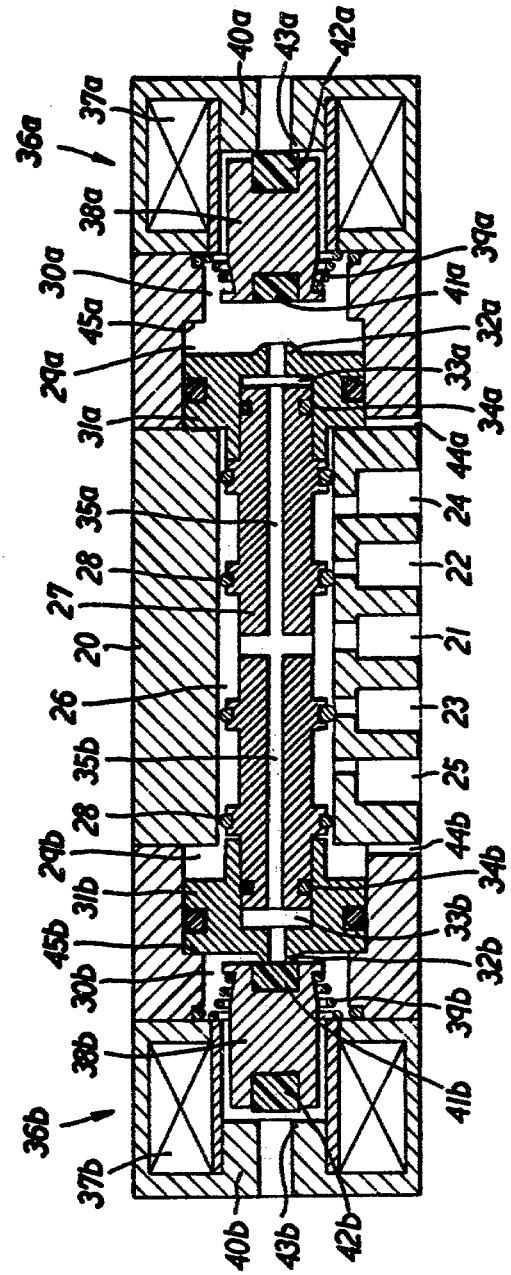
FIG. 4 is a diagrammatic longitudinal cross-section showing the valve of FIG. 3 in a second change-over position.

Under these circumstances, if the electromagnetic coil 37a is energized, the plunger 38a is attracted by the core 40a to shift its position to the right as shown in FIG. 4, uncovering the pilot valve seat 32a and in turn closing the drain valve seat 43a with the seal member 42a, whereupon the fluid pressure supplied to the input port 21 is admitted into the pilot chamber 30a through the pilot valve seat 32a. The pressure in the pilot chamber 30a is increased and acts on the piston 31a to shift it to the left along with the spool 27. As a result, the spool valve 27 is shifted to the second change-over position, communicating the input port 21 with the second output port 23 while connecting the first output port 22 with the first drain port 24.

If the electromagnetic coil 37a is de-energized when the spool valve 27 is in the second change-over position, the plunger 38a is pushed away from the drain valve seat 43a by the action of the spring 39a, moving to the left to close the pilot valve seat 32a on the piston 31a which has independently returned to the initial position abutting against the inner end wall of the piston chamber 29a, releasing the pressure in the pilot chamber through the drain valve seat 43a. When the plunger 38a is in an interium position short of the pilot valve seat 32a, the fluid pressure from the input port 21 is allowed to flow out through the axial passage 35a, pilot valve seat 32a and pilot chamber 30a. However, as the plunger 38a moves further to the left and comes closer to the pilot valve seat 32a, the fluid flow to the pilot chamber 30a through the pilot valve seat 32a is restricted while the drain valve seat 43a is gradually relieved of the constricting effects by the plunger 38a to allow more free flow of fluid therethrough. As a result, the fluid pressure in the axial bore 33a in the piston 31 is increased as compared with the pressure in the pilot chamber 30a to overcome the fluid pressure in the pilot chamber 30a which acts on the piston 31a. Due to the pressure differential, the piston 31a is caused to move independently to the right into the initial position or into abutment against the stopper 45a at the outer end of the piston chamber 29a, covering the pilot valve seat 32a with the seal member 41.

It is to be noted that the diameter of the exhaust valve seat 43a is sufficiently larger than the diameter $d_1$ of the pilot valve seat 32a, so that, when the plunger 38a is pushed back by the spring 39a upon de-energization of the electromagnetic coil 37a, the fluid pressure within the pilot chamber 30a is released rapidly through the exhaust valve seat 43a before the pilot valve seat 32a is closed completely by the plunger, facilitating the return to the initial position of the piston 31a.

In order to shift the spool valve 27 from the second change-over position to the first change-over position, the electromagnetic coil 37b of the pilot valve 36 at the opposite end is energized and then de-energized in the same manner.

As will be understood from the foregoing description, after shifting the spool valve by energization of the electromagnetic coil, the piston alone returns automatically to its initial position upon de-energization of the electromagnetic coil, so that, it suffices to move the plunger through a small distance in closing the pilot valve seat with the seal member at the inner end of the plunger and thus the spring 39a or 39b is required to have only a small charge.

Figure 5:
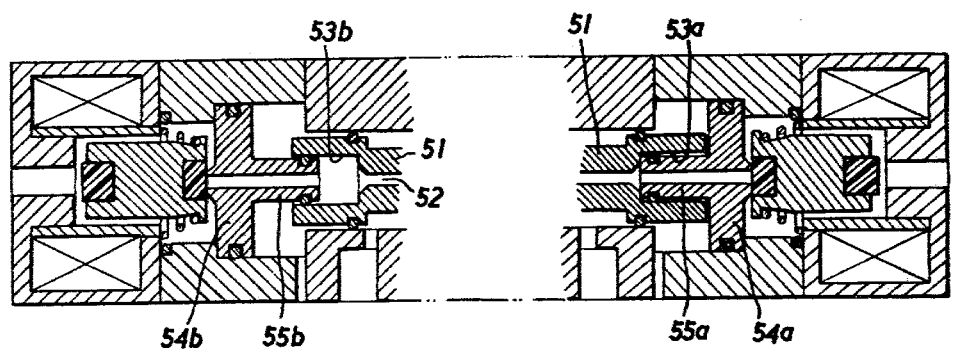
FIG. 5 is a diagrammatic cross-section showing a modification of the valve according to the present invention.

In the embodiment of FIGS. 3 and 4, the opposite ends of the spool 27 are slidably fit in the axial bores 33a and 33b of the pistons 31a and 31b. However, there may be employed an inverse arrangement as shown in FIG. 5 wherein the pistons 54a and 54b are provided with inwardly extending cylindrical portions 55a and 55b, respectively, of a reduced diameter while the spool valve 51 is provided with bores 53a and 53b at the opposite ends of the axial passage 52 for slidably receiving the cylindrical portions 55a and 55b of the respective pistons.

Figure 6:
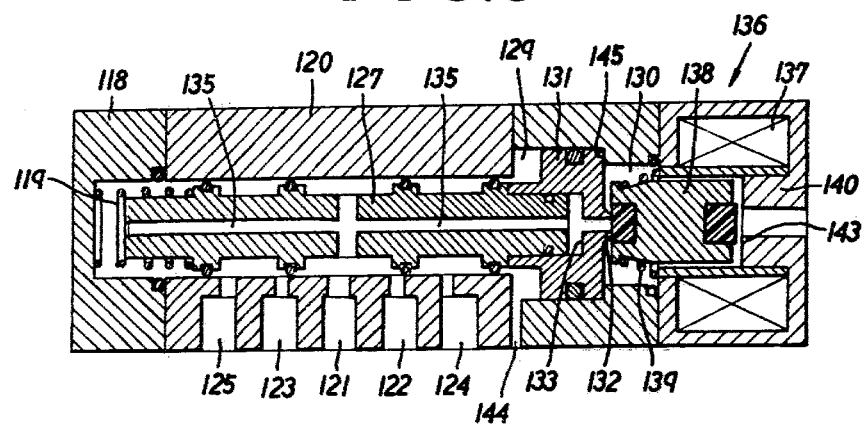
FIG. 6 is a diagrammatic longitudinal cross-section showing another modification of the valve according to the invention.

Referring now to FIG. 6, there is shown an embodiment employing a single solenoid and a single pilot valve. In this embodiment, one end of the valve is closed by an end housing 118 in which a spring 119 is mounted to urge the spool 127 constantly toward the other end. In other respects, the construction of the valve is same as the preceding embodiment.

Upon energizing the electromagnetic coil 137 of the pilot valve 136 of the single solenoid change-over valve in the first change-over position of FIG. 6, the plunger 138 is attracted by the core 140, opening the pilot valve seat 132 and at the same time closing the drain valve seat 143. As a result, the pressurized fluid at the input port 121 is admitted into the pilot chamber 130 through the pilot valve seat 132 and acts on the piston 131 which is therefore pushed to the left along with the spool 127. The spool 127 is now shifted to the second change-over position, holding the input port 121 in fluid communication with the second output port 123 while connecting the first output port 122 with the first drain port 124.

In the second change-over position, if the electromagnetic valve 137 is de-energized, the plunger 138 is pushed by the spring 139 away from the exhaust valve seat 143 to close the pilot valve seat 132 on the piston 131 which is in the left or outermost position in the piston chamber 129. Upon uncovering the drain valve seat 143, the fluid pressure in the pilot chamber 130 drops and gives in to the combined force of the fluid pressure within the axial bore 133 of the piston 131 and the spring 119 acting in the opposite direction, whereupon the piston 131 is moved to the right to abut against the stopper 145 and simultaneously the plunger 138 is pressed against the pilot valve seat 132 to close same. Simultaneously with the return movement of the piston 131, the spool 127 is returned to the first change-over position by the action of the spring 119.

Figure 7:
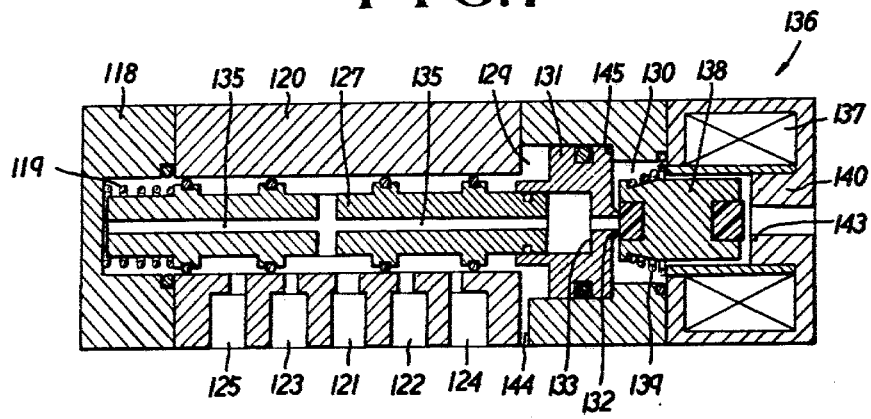
FIG. 7 is a view similar to FIG. 6 but showing the valve in a position wherein the piston has returned to its initial position independently of the spool.

The shift to the first change-over position of the spool 127 is attained by the action of the spring 119 independently of the piston 131. Therefore, upon de-energization of the electromagnetic coil 137, the piston 131 returns to its initial position irrespective of the position of the spool valve 127 even when the spool 127 is seized in the second change-over position for some reason as shown in FIG. 7, thereby ensuring closure of the pilot valve seat 132. The return of the piston 131 facilitates the closure of the pilot valve seat 132 to a significant degree as compared with the conventional construction wherein the piston is fixed on the spool and cannot return to its initial position independently of the spool. With the conventional construction just mentioned, it is necessary to provide on the plunger a large spring which can push forward the plunger through a large distance corresponding to the stroke length of the spool and at the same time to provide a solenoid device which has an increased electromagnetic power for attracting the plunger 138 to the core 140 against the force of the large spring. In contradistinction, the piston 131 according to the invention is adapted to return to its initial position independently of the spool 127 to ensure the closure of the pilot valve seat 132 with use of a spring and a plunger of small power and stroke.

What is claimed is:
1. A solenoid pilot operated valve comprising:
a spool casing internally defining a spool chamber and having an input port and a number of output and drain ports in communication with said spool chamber;
a spool valve slidably received in said spool chamber and having a number of seal ridges to connect said output ports selectively with either said input port or one of said drain ports;
a fluid passage formed axially through said spool valve in communication with said input port;
a piston slidably mounted on one end of said spool within a piston chamber formed contiguous to the outer end of said spool chamber and having an axial bore communicating at the inner end thereof with said axial fluid passage of said spool and terminating at the outer end in a pilot valve seat opening into a pilot chamber provided contiguously on the outer side of said piston chamber;
a plunger accommodated within said pilot chamber and movable toward and away from said pilot valve seat and a drain valve seat provided at the outer end of said pilot chamber;
plunger biasing means for constantly urging said plunger to seat on said pilot valve seat on said piston;
operating means for driving said plunger to unseat from said pilot valve seat and seat on said drain valve seat of said pilot chamber thereby bringing said pilot chamber into fluid communication with said input port through said axial fluid passage and allowing the fluid pressure to act on said piston to shift said spool to a different change-over position; and spool shifting means provided at the other end of said spool chamber and acting to return said spool to the initial position.

2. A solenoid pilot operated valve as defined in claim 1, wherein said drain valve seat has an effective diameter notably greater than that of said pilot valve seat.

3. A solenoid pilot operated valve as defined in claim 1, wherein said spool shifting means comprises:

a second piston slidably mounted at the other end of said spool within a second piston chamber formed contiguously at the other end of said spool chamber and having an axial bore communicating at the inner end thereof with said axial fluid passage of said spool and terminating at the outer end in a second pilot valve seat opening into a second pilot chamber provided contiguously to the outer end of said second piston chamber;

a second plunger accomodated within said second pilot chamber and movable toward and away from said second pilot valve seat and a second drain valve seat provided at the outer end of said second pilot chamber;

second plunger biasing means for constantly urging said plunger to seat on said second pilot valve seat on said second piston; and second operating means for driving said second plunger to unseat from said second pilot valve seat and seat on said second drain valve seat, thereby bringing said second pilot chamber into fluid communication with said input port through said axial fluid passage and allowing the fluid pressure to act on said piston to shift said spool to the first change-over position.

4. A solenoid pilot operated valve as defined in claim 1, wherein said spool shifting means comprises:

a cylindrical end casing closed at the outer end and having an axial bore contiguously to said spool chamber, and a compression spring mounted in said end casing to urge said spool to the initial position.

5. A solenoid pilot-actuated valve as defined in claim 1, wherein said plunger is provided with a resilient seal member at the inner and outer end faces to secure fluid-tight engagement with said pilot and drain valve seats, respectively.

6. A solenoid pilot operated valve comprising, in combination:

(a) a spool casing internally defining a cylindrical spool chamber and having an input port and a plurality of output and drain ports in communication with said spool chamber;

(b) a spool valve axially slidably received in said spool chamber and having a plurality of seal ridges to selectively connect said output ports with either said input port or one of said drain ports;

(c) a fluid passage formed axially through said spool valve in communication with said input port; and (d) a solenoid pilot provided at each end of said spool casing in association with said spool valve, comprising:

(i) a piston slidably mounted on one end of said spool within a piston chamber formed contiguously on the outer side of said spool chamber and having an axial passage communicating at the inner end thereof with said axial fluid passage of said spool and terminating at the outer end thereof in a pilot valve seat opening into a pilot chamber provided contiguously on the outer side of said piston chamber;

(ii) a plunger accommodated within said pilot chamber and axially movable toward and away from said pilot valve seat and a drain valve seat provided at the outer end of said pilot chamber;

(iii) plunger biasing means adapted to constantly urge said plunger to seat on said piston pilot valve seat; and (iv) a solenoid device actuatable to unseat said plunger from said pilot valve seat and seat said plunger onto said drain valve seat of said pilot chamber to bring said pilot chamber into fluid communication with said input port through said axial fluid passages of said spool valve and piston, thereby allowing the fluid pressure from said input port to act on said piston to shift said spool valve to another change-over position.

7. A solenoid pilot operated valve as defined in claim 6, wherein said drain valve seat has an effective diameter notably greater than that of said pilot valve seat.

8. A solenoid pilot operated valve as defined in claim 6, wherein said one end of said spool valve is slidably fitted into an axial bore formed in said piston.

9. A solenoid pilot operated valve as defined in claim 6, wherein said piston is slidably fitted into an axial bore formed in said one end of said spool valve.

10. A solenoid pilot operated valve as defined in claim 6, wherein said plunger is provided with a resilient seal member on inner and outer end faces thereof to secure fluid-tight engagement with said pilot and drain valve seats, respectively.

* * * * *